United States Patent Office 2,739,132
Patented Mar. 20, 1956

2,739,132

MANUFACTURE OF SUPPORTED CATALYSTS

Fredrick J. Riedl, Cicero, Ill., assignor to Universal Oil Products Company, Chicago, Ill., a corporation of Delaware No Drawing. Application August 25, 1952, Serial No. 306,287

14 Claims. (Cl. 252—439)

This invention relates to the manufacture of supported catalysts and more particularly to the preparation of these catalysts in a novel manner.

Various methods heretofore have been utilized in the preparation of supported catalysts and, in a preferred method, the support is impregnated with a solution containing the other component or components. The impregnating solution must meet certain specific requirements, including ready solubility, be of a character that will be readily and uniformly distributed on and throughout the support, and after being converted to the oxide, the resultant composite must possess good catalytic activity. I now have found that these objects may be attained and effective catalysts prepared through the use of a novel impregnating solution.

In one embodiment the present invention relates to a method of manufacturing a supported catalyst which comprises forming a peracid of a metal, commingling the same with a support, and converting the peracid to the metal oxide.

In a specific embodiment the present invention relates to a method of manufacturing a catalyst comprising alumina and molybdenum oxide, which comprises forming permolybdic acid, commingling the same with alumina particles, and converting the permolybdic acid to molybdenum oxide.

In another specific embodiment the present invention relates to the method of manufacturing a catalyst comprising alumina, molybdenum oxide and cobalt oxide, which comprises forming a solution of permolybdic acid, admixing cobalt nitrate therewith, commingling the resultant mixture with alumina, and heating the same to convert said mixture to the oxides.

In accordance with the present invention, an impregnating solution is obtained by forming a peracid of the metal desired in the catalyst and compositing this solution with the support. The impregnating solution will remain liquid and will not result in premature precipitation of solids for a sufficient length of time so that the solution may be satisfactorily utilized to obtain uniform and thorough dispersion thereof on and throughout the support. Uniform and complete dispersion of the catalytic components on and throughout the support is very important in forming catalysts which have high activity and long catalytic life.

Any suitable support may be used in accordance with the present invention. The support may include those having catalytic activity per se, those which in association with the other components of the catalyst exert a catalytic effect over and above that of the other component or components, and supports which serve merely as carriers for the active components of the catalysts and do not have catalytic activity per se.

In another embodiment of the invention, the catalyst also contains a halogen and, in this embodiment of the invention, alumina is particularly preferred as the support because it, in association with the halogen, appears to exert a peculiar influence with the other components of the catalyst. Other supports include compounds and particularly the oxides of zirconium, zinc, titanium, magnesium, thorium, etc. When a halogen is not used, or when a halogen which will not react with silica to form a volatile silicon-halogen compound is used, the support may comprise silica. In other cases, the support may comprise a mixture of two or more components and particularly of the oxides as, for example, composites of aluminum and boron, aluminum and titanium, aluminum and silicon, aluminum and zirconium, aluminum, silicon and zirconium, aluminum and magnesium, aluminum, silicon and magnesium, zinc and zirconium, zinc and magnesium, etc.

The supports may be either synthetically prepared or naturally occurring. Naturally occurring supports include clays, diatomaceous earth, feldspar, bauxite, etc., which may be acid or otherwise treated as desired. Synthetically prepared supports may be manufactured in any suitable manner. For example, alumina may be prepared by the reaction of a suitable aluminum salt, such as aluminum sulfate, aluminum nitrate, aluminum acetate, etc. with a suitable alkaline reagent, such as ammonium hydroxide, ammonium carbonate, to precipitate aluminum hydroxide. Silica gel may be prepared by the acidification of water glass or other suitable alkali metal silicate solutions. The support may be prepared either as a wet cake and subsequently formed into particles of definite size and shape by suitable methods such as grinding, pelleting, extrusion, etc., or the support may be formed into substantially spherical shape by passing droplets of the sol through a suitable suspending medium, which may be liquid or gaseous, wherein substantially spherical particles are formed. It is understood that the various supports which may be used are not necessarily equivalent.

In accordance with the present invention, a peracid is formed of the metal corresponding to the metal oxide desired in the catalyst, and the specific metal to be employed will depend upon the particular type of catalyst desired. Oxides of the elements in the left hand column of group VI of the periodic table, including the oxides of chromium, molybdenum, tungsten and uranium, are particularly desirable as catalysts for the conversion of organic compounds and particularly hydrocarbons. Other metal oxides which have found utility for catalysts include the oxides of metals in the left hand column of group V of the periodic table, and particularly vanadium and tantalum. The oxides of manganese in group VII of the periodic table and the oxides of titanium, zirconium, hafnium, and thorium in group IV of the periodic table also have found utility in catalytic composition. The oxides of the metals specifically set forth and particularly associations of two or more of these oxides are generally preferred for use as catalytic agents and, therefore, comprise the preferred components for use in accordance with the present invention. However, it is understood that any other metal which forms a soluble peracid compound may be employed and also that the various peracid solutions and catalytic composites are not necessarily equivalent.

A particularly preferred catalyst of the present invention comprises alumina and molybdenum oxide. This catalyst is prepared by forming a permolybdic acid solution and utilizing the same to impregnate pre-formed particles of alumina. The permolybdic acid solution may be prepared by reacting molybdic acid or other suitable source of molybdenum with hydrogen peroxide. It generally is preferred to utilize the hydrogen peroxide as an aqueous solution, which solution preferably contains from about 10% to about 50% by weight of hydrogen peroxide. The amount of hydrogen peroxide employed will be sufficient to insure complete dissolving of the molybdic acid and thus preferably is utilized in a molar excess of from about 3–5 or more mols of hydrogen peroxide per mol of molybdic acid. Forming of the permolybdic acid may be effected at any suitable temperature and preferably is effected at an elevated temperature which generally will not be above about 200° F. In another method, the hydrogen peroxide may be reacted with the molybdic acid at room temperature or below and then the mixture heated to insure complete dissolution of the molybdic acid. While molybdic acid is the preferred source of molybdenum, it is understood that any other suitable source of molybdenum may be employed as, for example, molybdenum oxides and particularly molybdenum trioxide may be utilized. The peracids of other metals may be formed in a similar manner by reacting a suitable source of the metal with hydrogen peroxide.

The peracid is preferably prepared as an aqueous solution for use in impregnating the support. The water may be introduced in preparing a paste or slurry of the molybdic acid or other source of the metal. The hydrogen peroxide is preferably utilized as an aqueous solution and further quantities of water thereby are introduced into the solution of peracid. When desired, additional water may be added to form the desired impregnating solution. While water is preferred as the solvent, it is understood that any other suitable solvent may be employed.

The impregnating solution may be composited with the support either before or after the latter had been dried, formed into particles of definite size and shape and/or calcined. As hereinbefore set forth, a preferred support comprises alumina and, in another preferred embodiment, the catalyst also contains halogen, including fluorine, chlorine, bromine and iodine. In one method, the fluorine may be composited with the alumina while the latter is in a wet state, the resultant composite formed into particles, and the particles dried and calcined. In another method the alumina may be formed into particles, dried and calcined, and then the halogen added thereto. In either case, the halogen may be added in any suitable manner, including particularly as an aqueous solution of the hydrogen halide or of the ammonium halide.

The alumina and/or aluminum-halogen composite may be dried at any suitable temperature which generally will range from about 200° to 600° F. or more and usually for a period of from 2 to 24 hours or more. When the support is to be calcined it may be calcined at a temperature which generally will range from about 600° to 1400° F. or more, preferably at a temperature of from about 800° to about 1200° F., and usually for a period of from about 1 to 12 hours or more. The drying and/or calcination may be effected in the presence of air, a reducing atmosphere such as hydrogen, an inert atmosphere such as nitrogen, or a mixture thereof. In still another embodiment the catalyst may be calcined in a reducing atmosphere and then calcined in an oxidizing atmosphere, or the reverse procedure may be utilized.

Another preferred catalyst of the present invention comprises alumina, with or without halogen, molybdenum oxide and cobalt oxide. In one method the permolybdic acid solution may be commingled with the alumina or alumina-halogen composite, and the cobalt subsequently introduced in the form of a suitable soluble cobalt compound, including cobalt nitrate, cobalt ammonium nitrate, cobalt ammonium chloride, cobalt ammonium sulfate, cobalt bromate, cobalt bromide, cobalt chloride, cobalt chlorate, cobalt fluosilicate, cobalt iodide, cobalt potassium sulfate, etc. However, in a preferred embodiment, cobalt nitrate or other suitable soluble salt of cobalt is commingled with the permolybdic acid solution, and the resultant mixture is utilized as the impregnating solution to be admixed with the support.

After the permolybdic acid solution, alone or containing cobalt nitrate or the like, has been composited with the support, the mixture is heated to a suitable temperature to develop the oxides of molybdenum and, when present, cobalt. Any suitable temperature to accomplish this may be employed, which temperature in general will be within the range of from about 500° to 1200° F. or more and preferably of from about 700° to 1000° F. The time of heating will be sufficient to effect the desired development of the oxides and may range, for example, from about 2 hours or less to 10 hours or more. Preferably the heating is effected in the presence of perfluent air or other oxygen-containing gas.

The concentrations of the components in the final catalyst will vary considerably depending upon the particular catalyst desired. In the alumina-molybdenum oxide-cobalt oxide catalysts, a preferred concentration comprises from about 1% to about 25% each of molybdenum oxide (calculated as Mo) and cobalt oxide (calculated as Co), with the alumina comprising the remainder of the catalyst and thus consisting of 50% or more by weight thereof. When a halogen is utilized it may be present in a concentration of from about 1% to about 20% by weight or more of the final catalyst.

Other preferred catalysts of this class comprise alumina, molybdenum oxide and the oxides of nickel and/or iron. This catalyst also may contain halogen and/or cobalt oxide. Still another preferred catalyst comprises alumina, tungsten oxide and the oxides of cobalt, nickel and/or iron. In still another embodiment this catalyst may contain molybdenum oxide and/or halogen.

In still another embodiment of the invention the composites as prepared in the above manner are sulfided in order to form the sulfides of molybdenum, tungsten, cobalt, nickel, iron and/or other metals, and the sulfidation may be effected in any suitable manner. In one method the composite is treated with perfluent hydrogen sulfide at a temperature of from about 500° to 1000° F. or more and in another method the composite is utilized for the treatment at an elevated temperature of a hydrocarbon or other fraction, particularly a gasoline fraction, containing sulfur compounds, and the oxides thereby are converted to the sulfides in situ.

The heretofore description has been directed primarily to the preparation of catalysts comprising alumina, molybdenum oxide and cobalt oxide, with or without halogen, and the corresponding sulfides. In the interest of simplicity, detailed descriptions of the preparations of catalysts containing other supports and other metal oxides or metal sulfides are not being repeated, but it is understood that the details of preparation specifically set forth herein also will apply to these other catalysts, and that the specific preparation will be suitably modified when required in the preparation of the other supports or metal oxides or sulfides.

The alumina-molybdenum oxide-cobalt oxide or alumina-molybdenum sulfide-cobalt sulfide catalysts, and particularly these catalysts containing halogen, are especially suitable for the treatment of organic compounds and particularly hydrocarbons. These catalysts are of especial advantage for use in the treatment of gasoline or gasoline fractions containing undesired impurities. The treatment of gasoline or gasoline fractions generally is effected in the presence of hydrogen at temperatures of from about 500° to about 800° F., although in some cases higher temperatures up to 850–900° F. may be employed. Atmospheric and preferably superatmospheric pressures ranging from 50 to 5000 pounds per square inch or more may be utilized. This treatment will serve to remove impurities containing compounds of sulfur, nitrogen, oxygen and arsenic from the gasoline or gasoline fraction and thereby is particularly suitable for treatment of gasoline or gasoline fractions prior to reforming of the gasoline in contact with a reforming catalyst containing a noble or expensive metal, in order to avoid the deleterious effects of these impurities on the reforming catalyst.

Similarly, the catalyst of the present invention may be used for the treatment of other hydrocarbon fractions in order to remove undesirable impurities as, for example, the treatment of aromatic solvents, kerosene, etc.

The catalyst of the present invention also may find utility for other conversion reactions of organic compounds and particularly hydrocarbons, including reforming of gasoline, dehydrogenation of normally gaseous or normally liquid hydrocarbons, isomerization of organic hydrocarbons, non-destructive hydrogenation of unsaturated hydrocarbons, hydrogen transfer reactions, alkyl reactions, polymerization reactions, etc. Dehydrogenation and reforming reactions generally are effected at temperatures of from about 800° to 1200° F. or more, while non-destructive hydrogenation reactions generally are effected at temperatures of from about 300° to about 800° F. The various reactions hereinbefore set forth may be effected in the presence of hydrogen when required or of advantage.

The following examples are introduced to illustrate further the novelty and utility of the present invention, but not with the intention of unduly limiting the same.

*Example I*

A catalyst was prepared to contain approximately 91% by weight of alumina, 0.3% by weight of combined fluorine (calculated as F), 5.5% by weight of molybdenum (calculated as Mo) and 3.5% by weight of cobalt (calculated as Co). This catalyst was prepared as follows: 10.53 grams of molybdic acid (commercial CP, 85% $MoO_3$) were slurried in 10 ml. of water. 28 grams of 30% hydrogen peroxide were added and the mixture was heated until all of the molybdic acid was dissolved and the decomposition of the hydrogen peroxide was complete. 17.98 grams of cobalt nitrate were dissolved in 10 ml. of water and added to the permolybdic acid solution.

Alumina pills were prepared by commingling ammonium hydroxide with aluminum chloride to form aluminum hydroxide. During the final washing and filtering of the aluminum hydroxide, sufficient hydrogen fluoride solution was commingled to form a composite containing about 0.3% by weight of fluorine. The aluminum hydroxide-halogen composite was dried, formed into cylindrical pills, and calcined at a temperature of about 1200° F.

The permolybdic acid-cobalt nitrate solution was added to 100 grams of the alumina-halogen pills, the excess solution was drained, the pills were dried at room temperature, calcined in perfluent air at 770° F., and finally calcined in perfluent hydrogen sulfide at 770° F.

The permolybdic acid solution remained liquid without precipitation of solids, and the cobalt nitrate readily dissolved in the solution. The resultant solution remained liquid without precipitation of solids so that it was readily used to impregnate the alumina pills and thereby form a catalyst having the composition hereinbefore set forth and containing the impregnating solution uniformly distributed on and within the alumina-halogen pills.

*Example II*

The catalyst as prepared in the above manner was utilized for the hydrodesulfurization of a heavy catalytic cycle oil obtained in the cracking of a Mid-Continent gas oil in the presence of a silica-alumina cracking catalyst. This heavy cycle oil had an A. P. I. gravity at 60° F. of 24.9° F., a bromine number of 18.8, an aromatic+olefin content of 39.5%, a sulfur content of 0.52% by weight, and a boiling range of from 450° F. to above 771° F. This cycle oil was subjected to treatment with the catalyst at a temperature of about 770° F., a pressure of 810 pounds per square inch, and a liquid hourly space velocity (defined as the volumes of oil per hour per volume of catalyst in the reaction zone) of 1.03, in the presence of hydrogen in an amount of 1950 cubic feet per barrel of oil. By treatment in the above manner, the sulfur content of the cycle oil was reduced to 0.11% by weight and the bromine number was reduced to 14.6. It will be noted that approximately 80% desulfurization was effected and, at the same time, hydrogenation of olefins was also effected.

*Example III*

A catalyst comprising alumina, molybdenum oxide and nickel oxide may be prepared by forming the permolybdic acid solution in the manner set forth in Example I and compositing a nickel nitrate solution therewith. The resultant solution is then impregnated on pre-formed particles of alumina, after which the composite is heated to 800° F. for 2 hours in perfluent air.

*Example IV*

A catalyst comprising zirconia and tungsten oxide may be prepared by forming pertungstic acid by commingling hydrogen peroxide with tungsten acid, and compositing the pertungstic acid with pre-formed particles of zirconia. In this catalyst tungstic oxide will comprise 15% by weight of the final composite.

*Example V*

A catalyst comprising alumina, halogen and vanadium oxide is prepared by forming aluminum hydroxide, compositing fluorine therewith in an amount of 0.5% by weight based on the final catalyst, forming the composite into particles and calcining the same at 1200° F. for 6 hours. Pervanadic acid is separately formed by commingling a 30% hydrogen peroxide solution with vanadic acid, and the resultant solution is commingled with the alumina-halogen particles, after which the composite is heated at 600° F. for 3 hours in perfluent air.

This catalyst may be utilized for the reforming of a straight run naphtha at a temperature of 980° F. and a pressure of 800 pounds per square inch in the presence of hydrogen in a ratio of 6 mols of hydrogen per 1 mol of hydrocarbon.

I claim as my invention:

1. The method of manufacturing a catalyst comprising alumina and molybdenum oxide which comprises commingling permolybdic acid with alumina and heating the composite to a temperature of from about 500° to about 1200° F. to convert the permolybdic acid to molybdenum oxide.

2. The method of claim 1 further characterized in that the resultant composite is sulfided to form a catalyst comprising alumina and molybdenum sulfide.

3. The method of manufacturing a catalyst comprising alumina and tungsten oxide which comprises commingling pertungstic acid with alumina and heating the composite to a temperature of from about 500° to about 1200° F. to convert the pertungstic acid to tungsten oxide.

4. The method of manufacturing a catalyst comprising alumina and chromium oxide which comprises commingling perchromic acid with alumina and heating the composite to a temperature of from about 500° to about 1200° F. to convert the perchromic acid to chromium oxide.

5. The method of manufacturing a catalyst comprising alumina and uranium oxide which comprises commingling peruranic acid with alumina and heating the composite to a temperature of from about 500° to about 1200° F. to convert the peruranic acid to uranium oxide.

6. The method of manufacturing a catalyst comprising alumina and vanadium oxide which comprises commingling pervanadic acid with alumina and heating the composite to a temperature of from about 500° to about 1200° F. to convert the pervanadic acid to vanadium oxide.

7. The method of preparing a catalyst comprising alumina, halogen, molybdenum oxide and cobalt oxide, which comprises forming a composite of alumina and halogen, separately forming a mixture of permolybdic acid and cobalt nitrate, commingling the resultant mixture with the composite of alumina and halogen, and heating the commingled materials to a temperature from about 500° to about 1200° F. to form a catalyst comprising alumina, combined halogen, molybdenum oxide and cobalt oxide.

8. The method of preparing a catalyst comprising alumina, halogen, molybdenum sulfide and cobalt sulfide, which comprises forming a composite of alumina and halogen, separately mixing permolybdic acid and cobalt nitrate, commingling the resultant mixture with the composite of alumina and halogen, heating the resultant composite to a temperature of from about 500° to about 1200° F. to convert said acid and nitrate to the oxides, and sulfiding the latter to form a catalyst comprising alumina, combined halogen, molybdenum sulfide and cobalt sulfide.

9. A method for the preparation of a supported catalyst which comprises commingling a metal compound with water containing sufficient hydrogen peroxide to completely dissolve the metal compound and form a peracid of the metal, the metal of said compound being selected from the group consisting of chromium, molybdenum, tungsten, uranium, vanadium, tantalum, manganese, titanium, zirconium, hafnium, and thorium, impregnating a support with the resultant peracid solution, and heating the impregnated support to a temperature of from about 500° to about 1200° F. to convert the peracid to a metal oxide.

10. The method of claim 9 further characterized in that said support comprises alumina.

11. A method for the preparation of a supported catalyst which comprises commingling an acid of a metal in the left hand column of group VI of the periodic table with water containing sufficient hydrogen peroxide to completely dissolve said acid and form the peracid of the metal, impregnating alumina with the resultant peracid solution, and heating the impregnated alumina to a temperature of from about 500° to about 1200° F. to convert the peracid to a metal oxide.

12. The method of claim 11 further characterized in that said metal is molybdenum.

13. A method of catalyst manufacture which comprises commingling molybdic acid with water containing sufficient hydrogen peroxide to completely dissolve said acid and form permolybdic acid, adding cobalt nitrate to the resultant solution, impregnating alumina particles with the solution of permolybdic acid and cobalt nitrate, and heating the impregnated particles to a temperature of from about 500° to about 1200° F. to convert the molybdenum and cobalt compounds to oxides.

14. The method of claim 13 further characterized in that the heated particles are sulfided to form a catalyst comprising alumina, molybdenum sulfide and cobalt sulfide.

References Cited in the file of this patent
UNITED STATES PATENTS

| | | |
|---|---|---|
| 1,948,408 | Watts | Feb. 20, 1934 |
| 2,194,186 | Pier et al. | Mar. 19, 1940 |
| 2,419,997 | Houdry | May 6, 1947 |
| 2,487,466 | Nahin | Nov. 8, 1949 |
| 2,508,014 | Davidson | May 16, 1950 |